United States Patent [19]
Maiden

[11] Patent Number: 5,253,637
[45] Date of Patent: Oct. 19, 1993

[54] HYPERFOCAL TRACKING SOLAR THERMAL COLLECTOR

[76] Inventor: Miles M. Maiden, P.O. Box 782, Blue Hill, Me. 04614

[21] Appl. No.: 849,772

[22] Filed: Mar. 12, 1992

[51] Int. Cl.⁵ .................................................. F24J 2/38
[52] U.S. Cl. ..................................... 126/696; 126/578; 126/600; 353/3
[58] Field of Search ............... 126/573, 576, 578, 600, 126/601, 602, 603, 605, 696; 353/3

[56] References Cited

U.S. PATENT DOCUMENTS

| | | |
|---|---|---|
| 4,022,188 | 5/1977 | Cohen et al. |
| 4,132,219 | 1/1979 | Cohen et al. |
| 4,295,621 | 10/1981 | Siryj .......................... 353/3 |
| 4,352,350 | 10/1982 | Johnson ..................... 353/3 X |
| 4,458,670 | 7/1984 | Lhenry ....................... 353/3 X |
| 4,995,377 | 2/1991 | Eiden ......................... 353/3 X |

*Primary Examiner*—Larry Jones
*Attorney, Agent, or Firm*—Daniel H. Kane

[57] ABSTRACT

A solar thermal collector incorporates an extended reflector surface constructed to concentrate radiation from a radiation source along a focal line. The reflector surface is oriented in a generally upward facing direction relative to the earth with the focal line above the reflector surface. A tracking system supports the extended reflector surface for double axis tracking of the sun by relative motion of the reflector surface to different tracking positions for optimizing concentrated radiation at the focal line. The tracking system is constructed to maintain the focal line of the extended reflector surface in a substantially horizontal orientation relative to the earth during tracking. An elongate absorber is positioned substantially at the focal line for absorbing and converting radiation to heat energy. An elongate absorber housing is coupled to the extended reflector surface and is constructed for positioning the elongate absorber substantially along the focal line. The housing provides an insulating enclosure for the elongate absorber for reducing conduction heat loss. The housing is formed with an elongate aperture oriented in a generally downward direction relative to the earth for receiving and passing concentrated radiation from the extended reflector surface to the absorber. A leveling system is coupled to the absorber housing. The leveling system is constructed to maintain the absorber housing in a substantially horizontal attitude with the aperture facing downward relative to the earth during tracking to suppress convection heat loss from the absorber and absorber housing.

20 Claims, 8 Drawing Sheets

HYPERFOCAL TRACKING SOLAR THERMAL COLLECTOR

TECHNICAL FIELD

The present invention relates to a new hyperfocal, convection and conduction heat loss suppressing, azimuthal and elevational tracking, solar thermal collector. The collector of the present invention is hyperfocal because it uses an extended reflector surface, for example in the configuration of a section of a cylindrical curve, for concentrating radiant energy at a focal line generally positioned above the extended reflector surface. The invention is solar thermal because an elongate absorber of a heat transfer system is mounted at the focal line for converting concentrated radiant energy to heat energy for transfer and storage. The invention is azimuthal and elevation tracking for tracking the sun to optimize concentrated radiant energy at the focal line and absorber. The invention is conduction suppressing because it encloses the absorber in an insulating housing to suppress conduction heat loss. The invention is also convection suppressing because it orients and maintains the insulating absorber housing with the radiation receiving aperture in a downward facing direction during elevational tracking to different tracking positions for suppressing convection heat loss.

BACKGROUND ART

A convection heat loss suppressing solar collector is described in the Jeffrey M. Cohen et al. U.S. Pat. Nos. 4,022,188 and 4,132,219. According to the Cohen et al. U.S. Patents, a generally planar horizontally extended absorber is provided in a downwardly directed insulating outer shell or housing. A radiation accepting aperture is formed in the lower surface of the insulating absorber housing and is covered with a solar energy transmitting sheet. A reflecting element is disposed beneath the insulating absorber housing for directing radiant solar energy upwardly through the aperture onto the absorber. A heat transfer fluid circulates in a duct through the absorber for transfer and storage of heat energy.

The solar collector apparatus of Cohen et al. is a "non-steered reflector", incapable of tracking the sun. As a result, the absorber of Cohen et al. is of extended planar configuration over an aperture of extended width in an endeavor to collect solar energy reflected at different angles from the reflector surface corresponding to different angles of elevation of the sun for specified solar collecting hours. The elongate reflecting surface is a section of a cylindrical parabola with the vertex of the parabola at one end of the reflecting surface. The width of the aperture extends along the axis of the parabola the preselected width distance for accepting the desired range of reflecting angles corresponding to different elevations of the sun.

A disadvantage of the Cohen et al. solar collector is that the extended planar absorber and wide absorber box shade and deflect a substantial portion of solar radiation from the reflector surface. The extended width of the aperture also increases the uninsulated area of the absorber housing with consequent increase in conduction heat loss. Furthermore, without elevational tracking, the Cohen et al. solar collector cannot provide optimum concentration and focusing of solar radiation at the different reflecting angles corresponding to different elevations of the sun. The extended planar absorber and wide absorber box are therefore required to pick up the unfocused solar radiant energy over a wide focal band rather than a concentrated focal line.

Because of the absence of azimuthal tracking around the horizon, the Cohen et al. solar collector loses substantial solar radiant energy by side reflections missing the absorber as the sun moves to azimuthal angles on either side of the reflector surface. If the length of the Cohen et al. planar absorber and insulating housing are increased to capture more of the side reflections, there is greater material cost and increased surface area and conduction heat loss. Without elevational and azimuthal tracking the Cohen et al. solar collector is limited overall to only several hours of efficient practicable solar energy collection during the day.

OBJECTS OF THE INVENTION

It is therefore an object of the present invention to provide a new convection suppressing solar thermal collector with azimuthal and elevational tracking of the sun or other radiation source for optimizing concentration, focusing the collection of solar radiant energy effectively at a focal line rather than an extended planar focal band. A feature of this arrangement is that the solar energy collection and conversion may be accomplished at an efficient focal line with a narrow absorber housing over the reflector surface to minimize shading and deflection of solar energy.

Another object of the invention is to provide a new double axis tracking system for convection heat loss suppressing solar thermal collectors which maintains the focal line of an extended cylindrical curve section at a substantially horizontal orientation relative to the earth during tracking in different tracking positions.

A further object of the invention is to provide a leveling mechanism for an azimuthal and elevational tracking convection heat loss suppressing solar thermal collector which maintains the absorber housing in a downwardly facing orientation and minimizes convection heat loss during tracking of the reflector surface to different tracking positions.

A feature of the azimuthal and elevational tracking system according to the invention is that the efficiency of collection, absorption and transfer of incident energy is optimized over all of the daylight hours without sacrificing conduction and convection heat loss and without reflective and dispursive losses of the incident solar radiation.

DISCLOSURE OF THE INVENTION

In order to accomplish these results the invention provides an extended reflector surface constructed to concentrate radiation from a radiation source substantially along a focal line. The reflector surface is oriented generally in an upward direction relative to the earth with the focal line above the reflector surface.

According to the invention a tracking system supports the extended reflector surface for tracking a source of radiation by relative motion of the reflector surface to different tracking positions for optimizing concentrated radiation at the focal line. The tracking system is constructed to maintain the focal line of the extended reflector surface in a substantially horizontal orientation relative to the earth during double axis tracking in different tracking positions.

An elongate absorber is positioned substantially at the focal line for absorbing and converting radiation to heat energy. An elongate absorber housing coupled to the extended reflector surface is constructed for positioning the elongate absorber substantially along the focal line. The absorber housing provides an insulating enclosure for the elongate absorber for reducing conduction heat loss. The housing is formed with an elongate aperture oriented in a generally downward direction relative to the earth for receiving and passing concentrated radiation from the extended reflector surface to the absorber.

A leveling system couples the absorber housing to the reflector surface. According to the invention the leveling system is constructed to maintain the housing in a substantially horizontal attitude with the aperture facing downward relative to the earth during tracking in different tracking positions of the reflector surface to suppress convection heat loss from the absorber and absorber housing.

In the preferred example embodiment, the solar thermal collector tracking system includes a solar thermal collector support base, an azimuthal tracking apparatus mounted on the support base, and an elevational tracking apparatus mounted on the azimuthal tracking apparatus. The reflector surface is mounted on the elevational and azimuthal tracking apparatus for maintaining the focal line of the reflector surface substantially horizontal relative to the earth during tracking of a radiation source to different tracking angles.

The azimuthal tracking apparatus incorporates an azimuthal tracking motor mounted on the support base and an azimuthal tracking platform mounted on the azimuthal tracking motor for supporting the reflector surface. The azimuthal tracking motor and platform are constructed for rotation of the platform and reflector surface to different rotational positions for azimuthal tracking of the sun.

The elevation tracking apparatus incorporates an elevation tracking motor mounted on the azimuthal tracking platform. The reflector surface is tiltably mounted on the azimuthal tracking platform and elevation tracking motor. The elevation tracking motor is constructed to tilt the reflector surface to different tilting angles for elevation tracking of the sun. An advantage of this arrangement is that azimuthal tracking is always achieved by a horizontal platform rotation relative to the earth for maintaining the focal line also at a horizontal attitude relative to the earth. Elevational tracking is achieved relative to the horizontal azimuthal tracking platform.

In the preferred example, the invention provides a leveling system in the form of a compensating coupling rotatably coupling the absorber housing to the extended reflector surface and azimuthal tracking apparatus. The compensating coupling is constructed for rotating the absorber housing around an elongate axis of the absorber housing relative to the reflector surface through a compensating angle. The compensating angle is approximately equal and opposite to a concurrent tilting angle of the reflector surface to maintain the elongate aperture of the absorber housing in a downward facing direction relative to the earth to reduce convection heat loss.

The invention also provides a new method of concentrating and collecting solar energy using an extended reflector surface in the configuration of a section of a cylindrical curve for concentrating solar energy at a focal line. The method steps include mounting an elongate absorber at the focal line for converting solar energy to heat energy, housing the absorber in an insulating absorber housing to reduce convection heat loss, and forming the absorber housing with an elongate aperture adjacent to the focal line facing the extended reflector surface for passing concentrated solar energy to the absorber.

The method proceeds by tracking the radiation source to different azimuthal angles by rotating the reflector surface to respective rotational angles around a substantially vertical axis relative to the earth. After azimuthal tracking of the radiation source there is tracking of the radiation source to different elevation angles above the horizon of the earth by tilting the reflector surface to different respective tilting angles around a substantially horizontal axis relative to the earth. The method thereby maintains the focal line and absorber in a substantially horizontal attitude relative to the earth during azimuthal and elevational tracking.

Finally the method steps provide for orienting and maintaining the aperture of the absorber in a downwardly facing direction relative to the earth during elevational tracking to reduce convection heat loss. This is accomplished by rotating the absorber housing relative to the reflector surface around an elongate axis of the absorber housing through a rotary angle opposite and substantially equal to the tilting angle of the reflector surface during elevational tracking.

Other objects, features and advantages of the invention are apparent in the following specification and accompanying drawings.

DESCRIPTION OF PREFERRED EXAMPLE EMBODIMENTS AND BEST MODE OF THE INVENTION

Figures 1, 2:
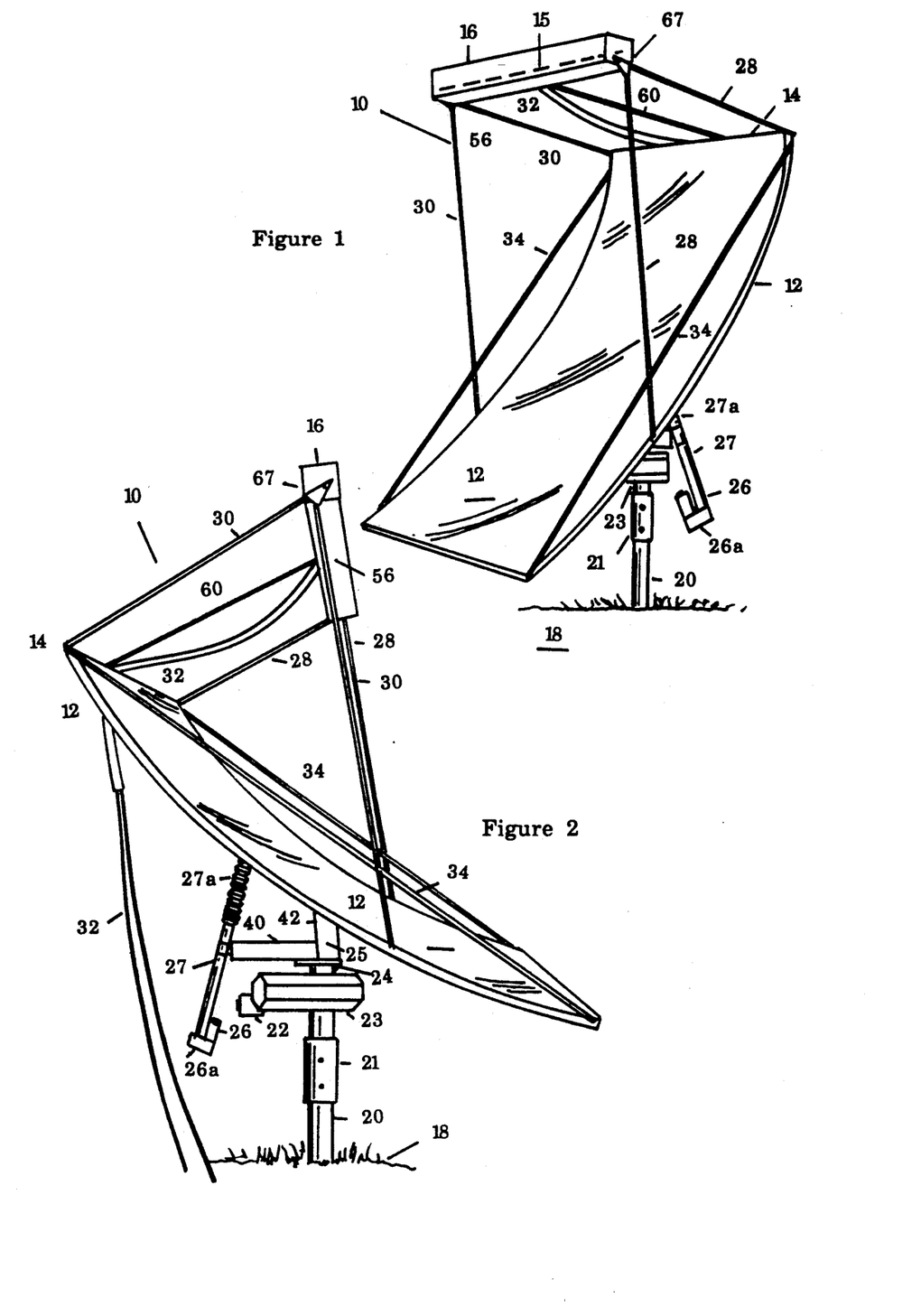
FIG. 1 is a front angle perspective view of a solar thermal collector according to the invention.
FIG. 2 is a side perspective view and FIG. 3 is a straight side view of the solar thermal collector showing the support base and tracking system for the reflector surface.
Figure 3:
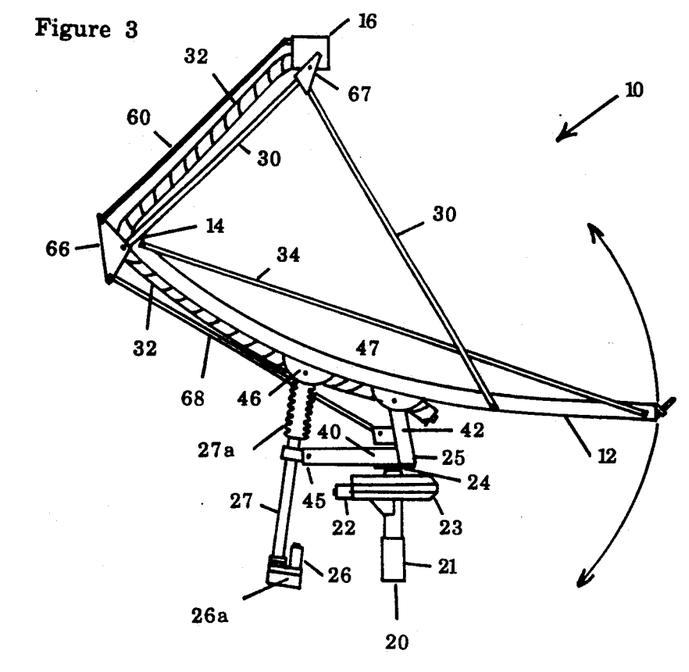

A solar thermal collector 10 according to the invention is illustrated in FIGS. 1, 2 and 3. The reflector surface 12 is an extended reflector surface in the configuration of a section of a cylindrical curve, for example a section of a cylindrical parabola. The vertex line 14 of the cylindrical parabola is at the upper end of the reflector surface 12. The focal line 15 of the cylindrical parabolic surface 12 lies within the absorber box or absorber housing 16. The extended reflecting surface 12 is oriented in a generally upward direction relative to the earth 18 and the focal line 15 is therefore generally above the reflector surface 12. Optimum concentration and focusing of solar energy or other radiant energy from a radiant source occurs when the parallel vertex line 14 and focal line 15 are in alignment with the radiation source.

The entire solar thermal collector assembly is mounted on a support base 20 in the form of a fixed mast or pole anchored in the earth 18. The azimuthal tracking apparatus 22,23,24,25 is mounted on the support mast or support base 20 by mounting sleeve 21. An azimuthal tracking motor 22 drives a gear transmission or gear box 23 with a vertically oriented drive axis 24 on which is mounted the azimuthal tracking platform 25. Reflector surface 12 is in turn mounted on the azimuthal tracking platform. The gear motor 22 and gear drive 23 rotate the azimuthal tracking platform 25 and reflector surface 12 around the vertical axis to different directions or angles of the horizon referred to as azimuthal angles.

Linear actuator 27 is also mounted on the azimuthal tracking platform 25 and includes the elevation tracking motor 26 and gear drive 26a which extend and retract the linear actuator for tilting the reflector surface 12 to different elevational tracking angles above the horizon. As hereafter described, two yokes 40,42 of the azimuthal tracking platform 25, a length 12a of the reflector surface 12, and a section 27a of the linear actuator 27 form a variable quadrangle mounting of the reflector surface 12 with three pivoting vertices. Extension and retraction of linear actuator 27 changes the length of one side 27a of the quadrangle, tilting the reflector surface to the desired elevational tracking angle.

The absorber box 16 is mounted generally over the reflector surface 12 by rigid support struts 28 and 30 at the respective sides of the absorber box 16 and reflector surface 12. The absorber box 16 is pivotally mounted for rotation around an elongate axis of the absorber box between the fixed mounting struts 28,30. A heat transfer fluid line 32 leads from the absorber box for circulating heat transfer fluid through the absorber all as hereafter described. Reinforcing tensioning support rods 34 are also provided along the sides of the extended reflector surface 12.

Figure 4:
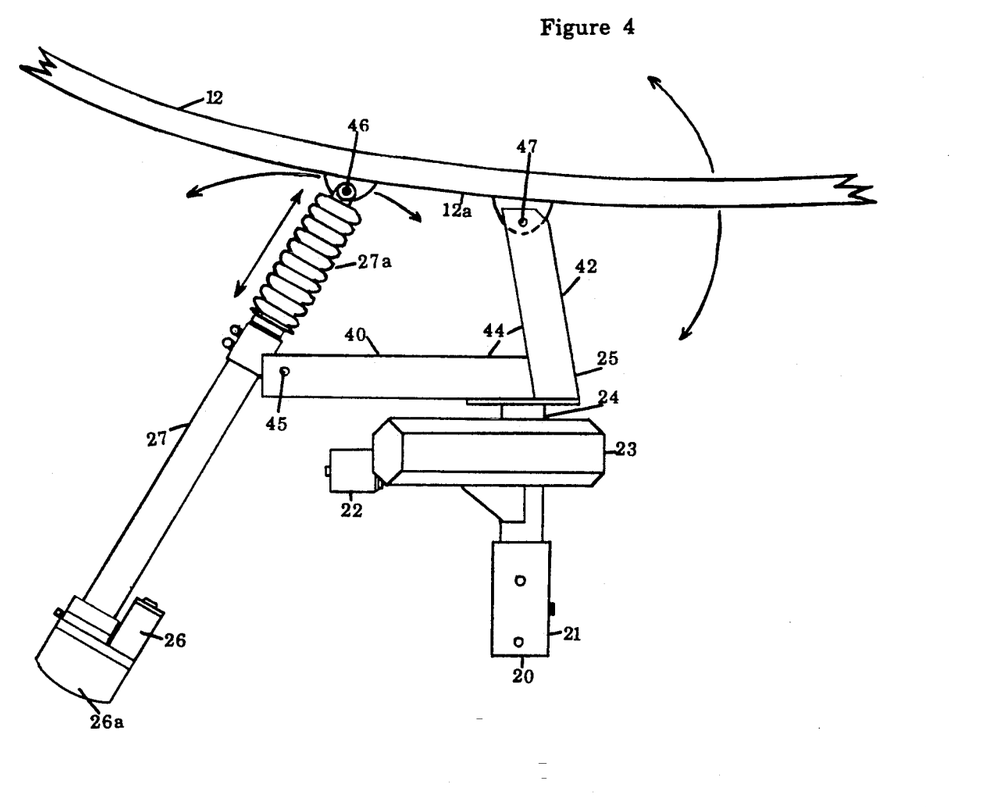
FIG. 4 is a fragmentary side view and FIG. 5 is a perspective view of the azimuthal tracking platform with mounting yokes and elevational tracking linear actuator which tiltably support the reflector surface.
Figure 5:
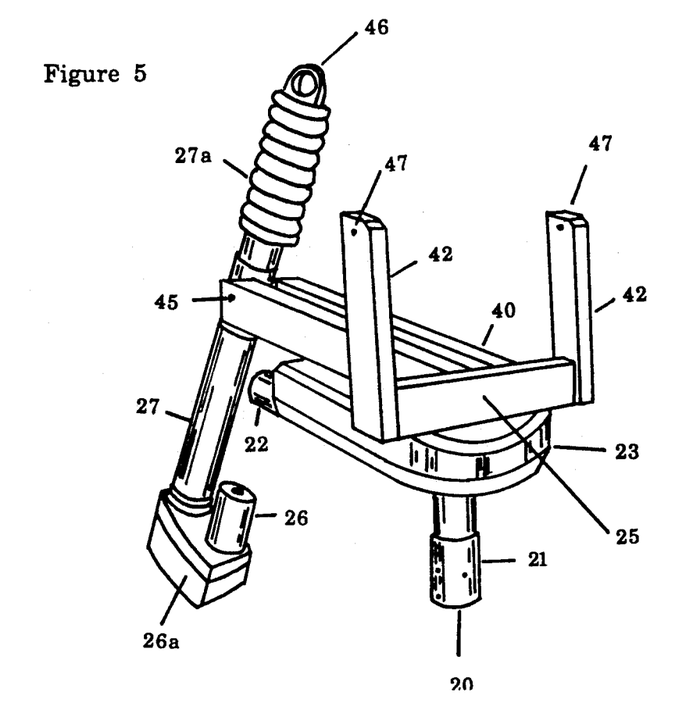

The quadrangle mounting of extended reflector surface 12 on the elevational and azimuthal tracking apparatus is illustrated in more detail in FIGS. 4 and 5. The azimuthal tracking platform 25 is mounted for rotation on the vertical drive shaft 24 of azimuthal gear drive 23. It is constructed with a pair of yokes 40 and 42 secured in fixed relationship to each other at a fixed angle 44, substantially a right angle. Each of the yokes 40,42 forms one side of the quadrangle mounting, and yoke 42 incorporates a pair of fixed spaced apart arms as shown in FIG. 5. Yoke 42 is pivotally coupled to the linear actuator 27 at pivot point 45. A length 27a of the linear actuator 27 forms another leg of the quadrangle mounting and is extendable and retractable.

The extended reflector 12 is pivotally mounted on the linear actuator 27 at a first location at mounting lug pivot point 46. The reflector surface 12 is also pivotally mounted on the yoke 42 of azimuthal tracking platform 25 at a second location at mounting lug pivot points 47 spaced from the first location of pivot point 46. A length 12a of the reflector surface 12 between these first and second locations forms the fourth leg of the quadrangle mounting. A characteristic of the quadrangle mounting is that three of the vertices 45,46,47 are pivoting vertices while the leg 27a is extendable and retractable for tilting the extended reflector surface 12 to different tracking angle elevations above the horizon.

As shown in FIGS. 4 and 5, the azimuthal tracking motor 22 drives a gear box 23 which in turn rotates the vertical drive shaft 24 on which is mounted the azimuthal tracking platform 25. The elevational tracking motor 26 similarly drives a gear box 26a which drives the linear actuator 27 and the extendable retractable leg 27a of the quadrangle mounting for the reflector surface 12. Control of the linear actuator elevational tracking motor 26 and azimuthal tracking motor 22 is achieved by sensory tracking such as infrared sensor tracking of the sun hereafter described.

Figure 6:
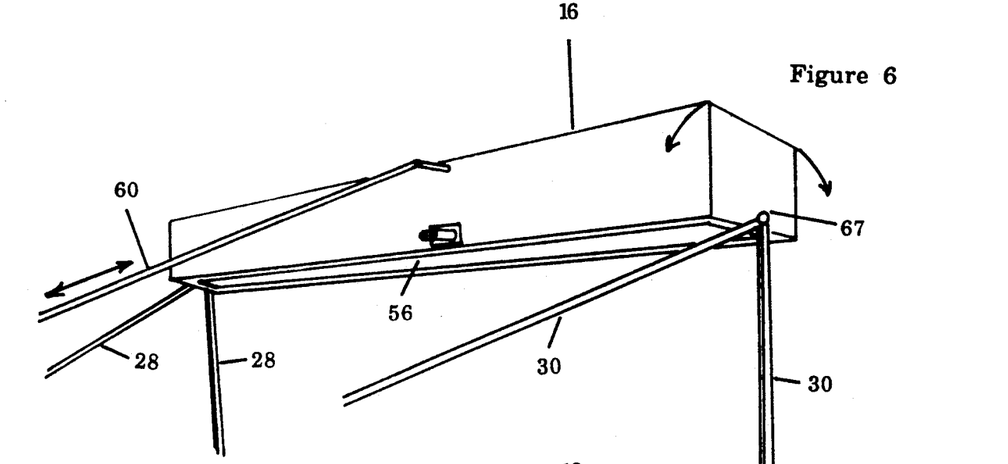
FIG. 6 is a detailed fragmentary perspective view of the absorber housing and compensating coupling for leveling the absorber housing during elevation tracking.
Figure 7:
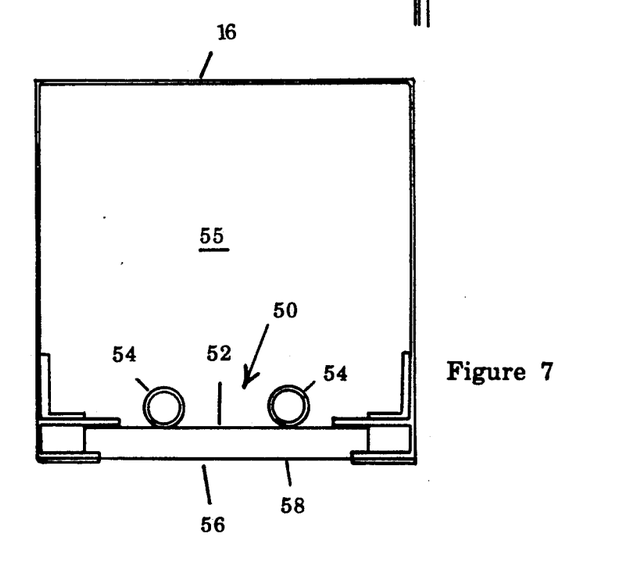
FIG. 7 is a detailed side cross section through the absorber housing showing the absorber and absorber ducts.

As shown in FIGS. 6 & 7, the absorber box 16 provides an elongate rectangular enclosure rotatably mounted on the rigid strut supports 28,30 fixed to the reflector surface. The struts 28,30 may be pivotally coupled to the sides of the absorber housing 16 by a triangle junction 67. The absorber housing 16 is pivotally coupled to a vertex of the triangle coupling 67. The absorber housing 16 contains the absorber 50 which consists of absorber plate 52 and heat transfer fluid circulating ducts 54. The absorber housing 16 provides an insulating enclosure with insulation 55 surrounding the absorber except on the side exposed through aperture 56 for receiving radiation concentrated by the reflector surface. The aperture 56 is covered by the solar energy light transmitting sheet 58 to reduce heat loss by convection and conduction at the aperture 56.

The absorber plate 52 may be for example a 4" (10 cm)×5'2" (1.55 m) copper plate coated with a selective black chrome surface 2 $\mu$thick on the side of the absorber plate 52 facing the aperture 56 for high absorption in the optical frequency range and low emissivity in the infrared frequency range. Such a copper plate with selective black chrome surface can be prepared for example with characteristic parameters of 95% absorption in the light optical range and emissivity of only 5 to 10% in the infrared range.

As previously mentioned, the absorber box 16 is mounted for rotation around an elongate axis of the absorber box on the fixed struts 28,30 secured to the reflector surface. The elongate axis of rotation is adjacent to the absorber 50. Rotation of the absorber box 16 around its elongate axis is controlled by a leveling system in the form of a leveling compensating coupling which maintains the absorber box 16 in a horizontal orientation with the aperture 56 facing in the downward direction relative to the earth for different elevational tracking angles of the reflector surface. The leveling coupling mechanism includes the leveling strut 60 pivotally coupled to the middle of the absorber box 16 as shown in FIG. 6. The leveling strut 60 forms a parallelogram arm segment with the struts 28,30. The ends of the parallelogram arm segment are provided by a width span of the absorber box 16 and a side of a triangle joint 66 as hereafter described.

The objective of the leveling compensating mechanism is to maintain the absorber box 16 in the same horizontal attitude with the aperture 56 facing in the downward direction despite changing elevational tilting angles of the reflector surface 12. In the preferred example embodiment this is accomplished by coupling the leveling strut 60 to a horizontal component of the solar thermal collector which maintains its horizontal orientation, in this case the azimuthal tracking platform. A more detailed description of the leveling compensating mechanism 62 follows with reference to FIGS. 8A, 8B, and 8C.

Figure 8A:
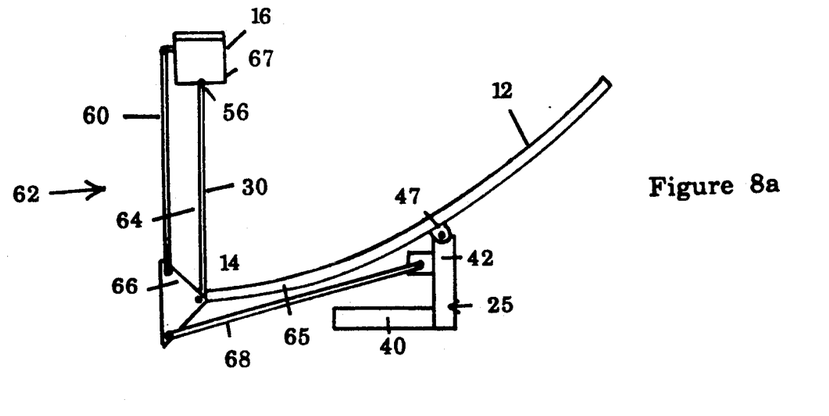
FIGS. 8A, 8B, and 8C are fragmentary diagrammatic side views of the reflector surface, absorber housing, and leveling system compensating coupling with the reflector surface at three different tilting angles during elevation tracking.
Figure 8B:
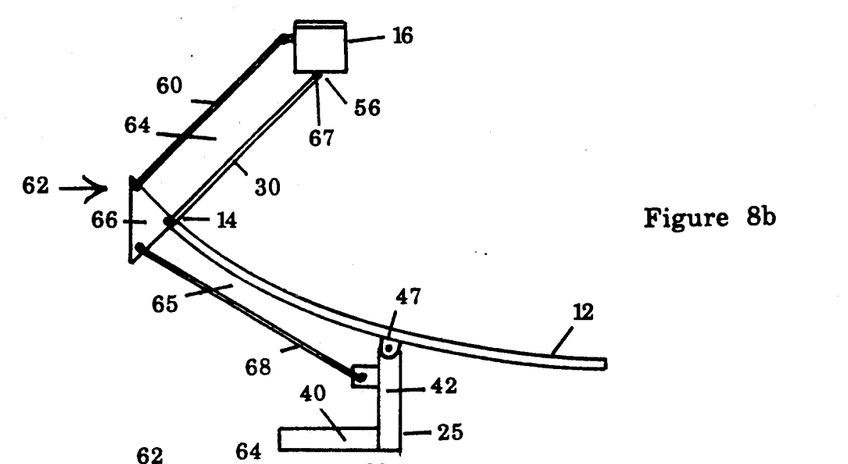
Figure 8C:
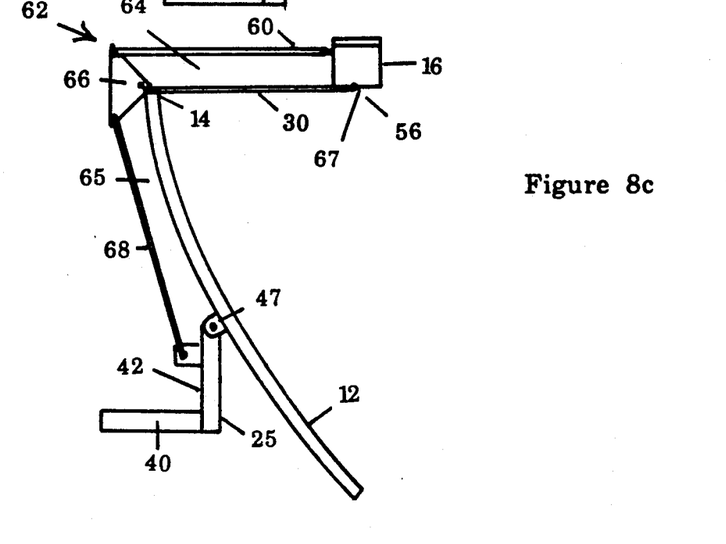

FIGS. 8A, 8B and 8C show the reflector surface 12 at three different elevational tracking angles, with the sun overhead at 90° in FIG. 8A, with the sun at 45° above the horizon in FIG. 8B, and with the sun substantially at an elevational angle of 0° just above or at the horizon in FIG. 8C. The leveling compensating mechanism is provided by an articulating arm 62 of first and second elongate parallelogram arm segments 64,65 having parallelogram sides and pivoting vertices. The first and second parallelogram segments 64,65 are joined at a pivoting triangle joint 66 pivotally mounted at one vertex of the triangle joint to the vertex line 14 at the center of the upper end of reflector 12. The ends of the absorber housing box 16 are pivotally coupled to the struts 28,30 so that the absorber box rotates about an elongate axis as described.

The first parallelogram arm segment 64 comprises the reference support strut 30 and leveling compensating strut 60 pivotally coupled in parallel. The struts 30 and 60 are pivotally coupled to respective vertices of the pivoting triangle joint 66. They are pivotally coupled at the other ends to spaced apart locations of the absorber box 16 as previously described with reference to FIG. 6.

The second parallelogram arm segment 65 of the articulating arm 62 also incorporates a reference side strut provided by a length 12b of the reflector surface and a moveable leveling strut 68. The side struts 12b, 68 of the second parallelogram arm segment 65 are pivotally coupled at one end to respective vertices of the pivoting triangle joint 66. The leveling compensating strut 68 is coupled at the other end to the azimuthal tracking platform 25 which provides the horizontal reference for maintaining the absorber box 16 in the same horizontal attitude as the azimuthal tracking platform and with the aperture 56 facing in a downward direction for suppressing convection heat loss. The leveling compensating mechanism of FIGS. 8A, 8B and 8C is analogous to a desk lamp level compensating articulating arm of parallelogram segments.

In the diagrammatic views of FIGS. 8A, 8B and 8C depicting the level compensating coupling arm 62 with the reflector surface 12 at different tilting angles, the following points are noted. The reference strut 30 of parallelogram segment 64 is one or both of the side struts 28,30 positioned at the sides of the reflector surface 12. The moveable leveling strut 60 is positioned at the center of the reflector 12 between the sides as is the pivoting triangle joint 66. However the effective mechanical and equivalent result is the parallelogram segment 64 as viewed from the side in FIGS. 8A, 8B, and 8C with all of the vertices of the parallelogram segment 64 permitting pivotal motion of the side struts and ends of the parallelogram segment structure.

The reference strut 12b of parallelogram segment 65 is formed by a length 12b of the reflector 12 which of course extends in area from one side of the reflector to the other. The moveable strut 68 which also forms a level compensating strut coupled to the level compensating strut 60 through pivoting triangle joint 66 is also coupled at the center of the reflector 12 between the sides. While the effective parallelogram reference struts 30, 12b maintain a fixed angular relationship with respect to each other, the moveable level compensating struts, 60,68 extend and retract back and forth by the pivoting motion of the triangle joint 66 as the reflector 12 is tilted to different angles. This compensating motion rotates the absorber box 16 through an angle substantially equal and opposite to the tilting angle of the reflector 12 so that the absorber box 16 remains in a horizontal orientation parallel with the earth and with the aperture 56 facing always in a downward direction.

A variety of other leveling systems or coupling compensating mechanisms may be used for leveling the absorber housing and maintaining the aperture in a downward facing direction. One type of independent leveling system which does not require mechanical coupling to a reference base support is a combination mercury level switch and actuating motor for rotating the absorber housing 16 relative to the reflecting surface 12. Upon tilting of the reflector 12, the mercury level switch senses the tilting angle and actuates the absorber housing rotation motor to maintain a horizontal orientation relative to the earth. Similarly, an electronic carpenter's level may be used to actuate an absorber housing rotation motor.

An alterative level compensating mechanical coupling between the absorber housing 16 and azimuthal tracking platform is a cable leveling coupling in place of the struts 60,68 and pivoting triangle joint 66. The cable can then push and pull the absorber box 16 for compensating rotation of the absorber housing to maintain a horizontal orientation. Alternatively or in addition the absorber housing 16 may be spring loaded to return to the horizontal position as it is released by the cable. According to a further alternative configuration, a chain and gear drive may provide the compensating leveling coupling between the absorber housing 16 and azimuthal tracking platform 25 or other horizontal reference base support.

According to yet another example embodiment, the absorber box or absorber housing 16 is pivotally mounted on the fixed struts 28,30 and is provided with depending or hanging weights to form a pendulum. Gravitational force then maintains a horizontal orientation of the absorber housing as the reflector 12 tilts through different elevational angles. To minimize swinging motion which may be caused by wind, the pivoting or rotational motion of the pendulum configuration absorber housing is dampened to permit low frequency damping motion but to prevent higher frequency vibrations. Damping of the pendulum motion may be accomplished using friction gears or hydraulic cylinders with viscous fluid. The preferred example and best mode leveling system according to the invention however is the articulated arm type coupling illustrated in FIGS. 1-3, 8A, 8B and 8C.

Figure 9:
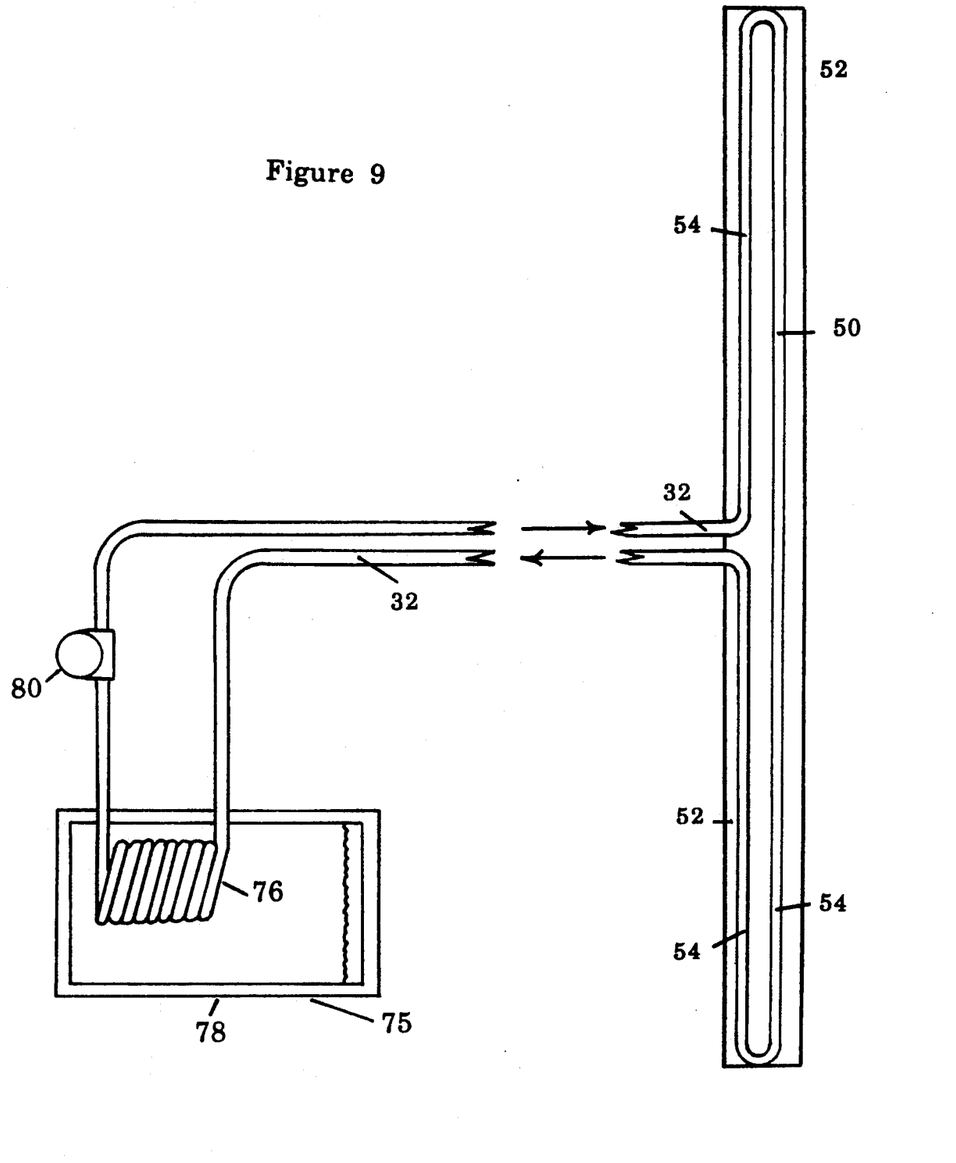
FIG. 9 is a diagrammatic plan view of the heat transfer liquid circulating system for transfer and storage of heat energy.

The heat transfer fluid circulating system for transfer of heat energy from the absorber 50 to a solar thermal hot water heater 75 with an insulated storage tank 78 is illustrated in FIG. 9. A pump 80 circulates an appropriate heat transfer fluid through the ducts 54 coupled in heat transfer relationship with absorber plate 52 and through insulated fluid transfer lines 32 to a heat exchanger coil 76. The heat transfer coil 76 may be immersed in water contained in the tank 78 of solar hot water heater 75. The solar hot water heater 75 may be a preheater adjunct of another hot water heater system or a stand alone solar hot water heater. The pump and pump motor 80 may be controlled by a thermostat which senses the temperature of heat transfer fluid in the absorber 50 to initiate circulation when the temperature reaches a threshold level. Preferably a differential thermostat is provided with temperature sensors at the absorber 50 and in the tank 78 for initiating circulation when a temperature differential threshold is reached.

The simplest heat transfer fluid is of course water. However in a heat transfer fluid closed circuit application as illustrated in FIG. 9, a liquid glycol and water mixture may be used for lower temperature applications and environments. For high temperature applications for example above 250° F. an oil such as vegetable oil may be used in the closed circuit heat transfer loop. For example, peanut oil or soy oil provide a nontoxic heat transfer liquid medium. For desiccant air conditioning system applications, oil is required for operation of the heat transfer fluid, for example at 350° F. for recharging the desiccant bed.

Figure 10:
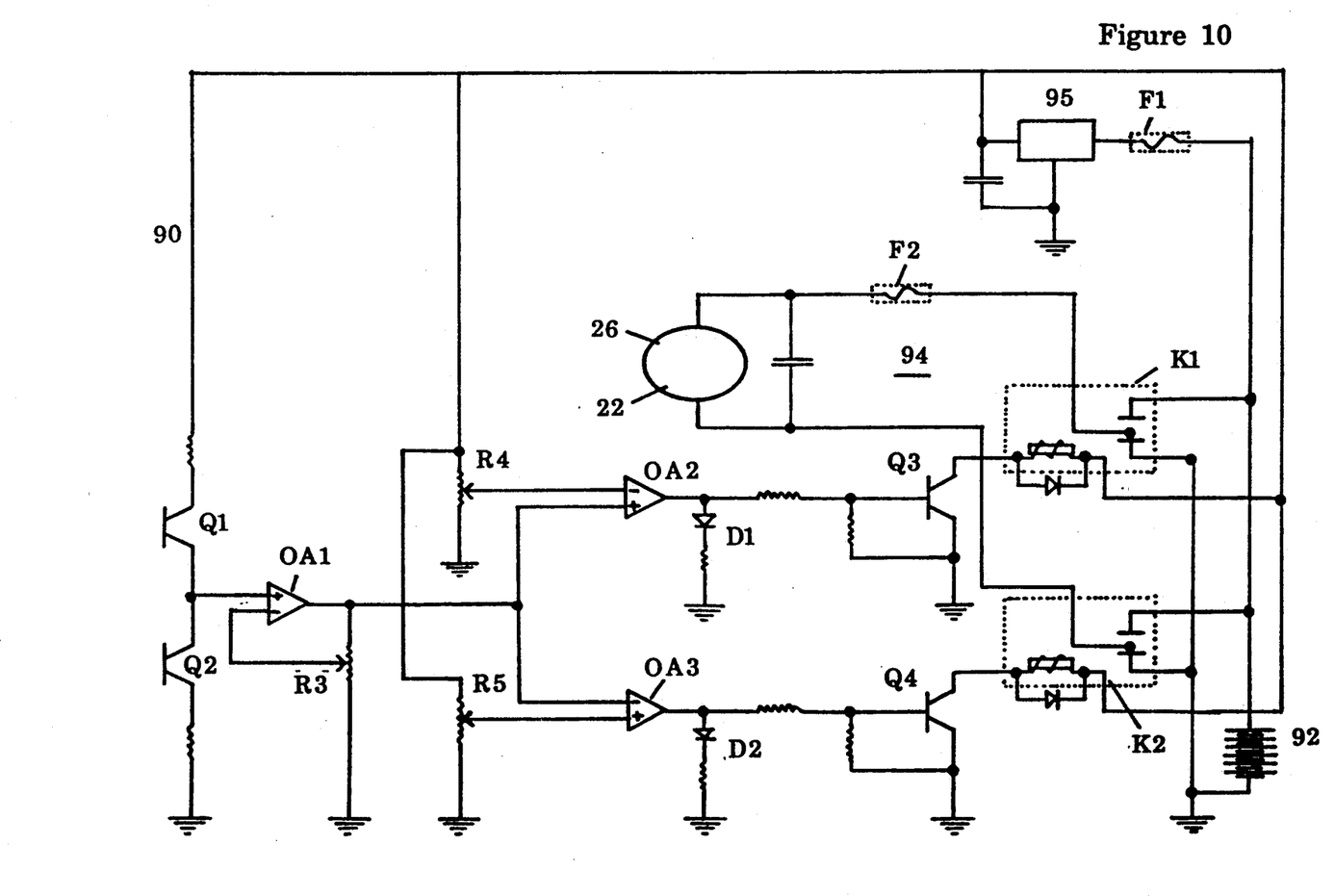
FIG. 10 is a schematic circuit diagram of the electrical control circuitry for the solar thermal collector.

A tracking control circuit 90 for controlling either the azimuthal tracking motor 22 or elevation tracking motor 26 is illustrated in FIG. 10. One such tracking control circuit 90 is provided for each of the tracking motors. The tracking control circuit 90 is a differential sensor circuit responsive to the difference in radiation falling on radiation sensing cells Q1,Q2. In the preferred example embodiment of FIG. 10, infrared sensors Q1,Q2 such as generic designation SY32PT cells are used although photocells and optical transistors in the optical frequency range may also be used.

The common coupling between series coupled Q1 and Q2 is applied to the input of operational amplifier OA1 which is responsive to the difference in conductivity between infrared sensors Q1,Q2. The polarity and amplitude of the output signal from op amp OA1 is determined by the polarity and magnitude of the difference in conductivity between Q1 and Q2. Op amp OA1 in turn controls dual operational amplifiers OA2 and OA3 having inputs coupled in opposite polarity to the output of OA1. Either op amp OA2 or op amp OA3 is conducting at its output according to the polarity of the signal at the output of OA1.

Operational amplifiers OA2 and OA3 in turn control the conductivity of respective output transistors Q3 and Q4 which in turn control relays K1 and K2. According to which relay is closed, relays K1 and K2 control the polarity of the coupling of battery power supply 92 in the motor circuit 94. The tracking motors 22,26 are reversible motors for azimuthal tracking right or left around the horizon and elevational tracking up and down above the horizon according to the polarity and magnitude of difference in radiant energy falling on sensors Q1 and Q2. Diodes D1 and D2 are light emitting diodes for indicating the tracking status. Voltage regulator 95 taps the battery 92 to provide a constant power supply for the electronic circuit components. Fuses F1 and F2 respectively protect the motor circuit 94 and the voltage regulator 95 and electronic components. The battery power supply 92 may be, for example, a 12 volt storage battery.

Variable rheostats R3,R4, and R5 may be adjusted to set the sensitivity level of the differential sensor circuit. For example the sensitivity may be set at a higher threshold differential in conductivity between infrared sensors Q1 and Q2 during windy conditions. Wind buffeting of the reflector surface and wind induced motion may initiate unwanted oscillatory tracking sequences which may be "filtered out" by increasing the differential threshold and lowering the sensitivity of the circuit. A threshold light level switch or threshold infrared radiation level switch may also be incorporated into the circuit to prevent turn on of the tracking motors below a threshold radiant energy level. Such a "light thermostat" prevents unwanted searching or hunting for a radiation source when clouds obscure the sun etc. A typical threshold light level switch might be set for example to turn off the tracking motors below 50 BTU's/FT$^2$/HR.

Similarly, a low level light thermostat may be incorporated in the circuit to turn on the tracking motors when the light level or radiant energy falls below 0.5 BTU/FT$^2$/HR in the evening. The low level circuit may be arranged to return the reflector surface to a zero position for example facing approximately east at the horizon where the sun will rise next morning. Furthermore, instead of using the special purpose analog control circuits 90 as illustrated in FIG. 10, a microprocessor control circuit may be coupled to the infrared sensors and light thermostats. Appropriate tracking software may program the microprocessor to achieve these objectives through control of the tracking motors.

Figure 11A:
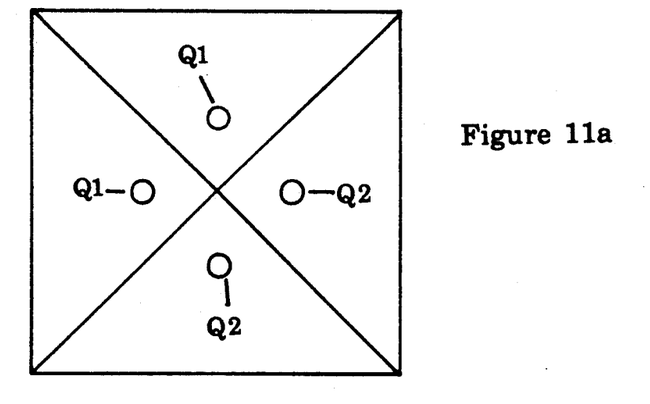
FIGS. 11A is a fragmentary plan view of an alternative configuration tracking "quad sensor pod" to be mounted in fixed relation to the reflector.
Figure 11B:
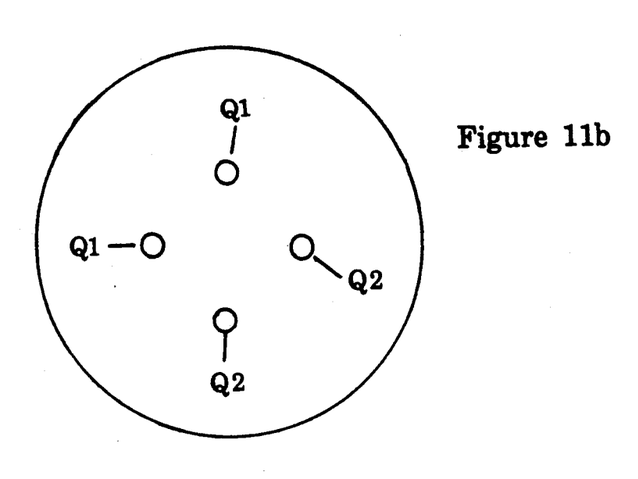
FIG. 11B is an exploded view from the side of the "quad sensor pod" for tracking a radiation source.

With two sensors Q1,Q2 for each tracking motor, a total of four infrared sensors or other light sensors are arranged for dual axis tracking in the azimuthal and elevational directions. For infrared sensors, the four sensors may be arranged in a square or cross configuration with two sensors spaced apart along each axis. The sensors may be housed inside an infrared transparent plastic pod 100 such as, for example, a four sided pyramid with sides inclined at 45° angles as illustrated in FIG. 11A. The four sensors Q1,Q2,Q1,Q2 may then be secured on the inside surfaces of the pod, for example, respectively centered on the four sides of the pyramid. The sensitive face of each of the sensors is therefore angled approximately 45° away from the vertical axis of the pyramid. A preferred example of a quad sensor pod 101 is illustrated in FIG. 11B. The four sensors Q1,Q2,Q1,Q2 are housed in an egg shaped pod 101. The sensors are mounted on respective support leads 102 extending outwardly at approximately 45° at respective quadrants equally spaced around the pod 101. Sensor leads 102 extend through a support stem 28a which may be attached to strut 28 as a strut extension as hereafter described. The leads 102 are coupled in control circuitry 90 as shown in FIG. 10.

The quad sensor pod 100 or 101 is oriented with two of the sensors oriented and aligned along the azimuthal direction and the other two sensors oriented and aligned along the elevational direction. The quad sensor pod may be positioned anywhere on the reflector 12 and is rigidly connected to the reflector for movement as a unit with the reflector as it rotates and tilts. The quad sensor pod 100 should also be positioned at a location with reference to the reflector where shadows from the superstructure do not fall. Successful locations include the bottom edge of the reflector and lower sides. In the preferred example, the fixed strut 28 shown in FIG. 1 on the side of the reflector surface extending from the vertex line 14 of the cylindrical parabola to the focal line 15, is extended beyond the absorber box 16 at the top of the reflector 12. The quad sensor pod 101 is mounted on the end of the strut extension 28a in front of the absorber box 16. The quad sensor pod is fixed to the strut extension 28a which is in turn fixed to street 28 and reflector 12 for rotation and tilting with the reflector 12. The pod is mounted on the strut extension 28a so that it is not affected by the leveling rotation of absorber box 16.

At whatever location is selected for the quad sensor pod, the reflector 12 is first positioned at the azimuthal and elevational tracking position for optimum focus of light from the radiant source onto the absorber 50 at focal line 15. The quad sensor pod 100 or 101 is then aimed at the radiation source and fixed in position. In the preferred example embodiment, the elongate axis of the quad sensor pod is aligned with the fixed strut 28 which extends from the vertex line 14 to the focal line 15 and which is aimed at the radiation source in the position of optimum focus of the reflector surface. Other configuration pods may of course also be used with the four sensors Q1,Q2,Q1,Q2 distributed in an appropriate square or cross configuration and with axes coinciding with the azimuthal and elevational tracking directions. The spacing between two sensors Q1,Q2 along one of the dual axes may be, for example in the order of 2" (5 cm).

After the quad sensor pod 100,101 is installed with proper alignment and orientation aimed at the radiation source while the reflector is also oriented for optimum focusing, the control circuits 90 may also be adjusted for the zero point or null point. Variable rheostats, R3,R4, and R5 are adjusted for zero output from the op amps so that the tracking motors off. The sensitivity of the differential sensor tracking control circuits to differences in radiation at the sensors Q1,Q2 and therefore differences in conductivity may also be selected and adjusted. Once the null point setting is achieved and the desired differential threshold sensitivity selected, the solar thermal collector system is ready for operation.

While the invention has been described with reference to particular example embodiments it is intended to cover all modifications and equivalents within the scope of the following claims.

What is claimed is:

1. A solar thermal collector comprising:
   an extended reflector surface constructed to concentrate radiation from a radiation source along a focal line, said reflector surface being oriented in a generally upward direction relative to the earth with the focal line above the reflector surface;
   a tracking system supporting the extended reflector surface for tracking a source of radiation by relative motion of the reflector surface to different tracking positions for optimizing concentrated radiation at the focal line, said tracking system being constructed to maintain the focal line of the extended reflector surface in a substantially horizontal orientation relative to the earth during tracking in different tracking positions;
   an elongate absorber positioned substantially at the focal line for absorbing and converting radiation to heat energy;
   an elongate absorber housing coupled to the extended reflector surface for rotation around an elongate axis of the absorber housing, said absorber housing being constructed for positioning the elongate absorber substantially along the focal line, said absorber housing comprising an insulating enclosure for the elongate absorber for reducing conduction heat loss, said absorber housing being formed with an elongate aperture oriented in a downward direction relative to the earth for receiving and passing concentrated radiation from the extended reflector surface to the elongate absorber;
   and a leveling system coupled to the absorber housing, said leveling system being constructed to maintain the absorber housing in a substantially horizontal attitude and in a rotational position with the elongate aperture facing downward relative to the earth during elevational tracking in different tracking positions of the reflector surface to suppress convection heat loss from the elongate absorber and absorber housing.

2. The solar thermal collector of claim 1 wherein the tracking system comprises:
   a solar thermal collector support base;
   an azimuthal tracking apparatus mounted on the support base;
   an elevational tracking apparatus mounted on the azimuthal tracking apparatus;
   and said extended reflector surface being mounted on the elevational and azimuthal tracking apparatus for maintaining the focal line of the reflector surface substantially horizontal relative to the earth during tracking of a radiation source to different tracking positions.

3. The solar thermal collector of claim 2 wherein:
   the azimuthal tracking apparatus comprises an azimuthal tracking motor mounted on the support base and an azimuthal tracking platform mounted on the azimuthal tracking motor for supporting the reflector surface, said azimuthal tracking motor and platform being constructed for rotation of the platform and reflector surface to different rotational positions for azimuthal tracking of a radiation source;
   and the elevation tracking apparatus comprises an elevation tracking motor mounted on the azimuthal tracking platform, said reflector surface being tiltably mounted on the azimuthal tracking platform and elevation tracking motor, said elevation tracking motor being constructed to tilt the reflector surface to different tilting angles for elevational tracking of a radiation source.

4. The solar thermal collector of claim 3 wherein the elevation tracking motor comprises a linear actuator and the azimuthal tracking motor comprises a gear motor.

5. The solar thermal collector of claim 4 wherein the azimuthal tracking platform comprises an L shaped mount with first and second yokes rigidly joined at first ends, the reflector surface being pivotally mounted on the other end of the first yoke, said linear actuator comprising an extendable arm pivotally coupled between the other end of the second yoke and at a location of the reflector surface spaced from the first yoke, said first and second yokes of the L shaped mount, the extendable arm of the linear actuator, and a length of the reflector surface forming a variable quadrangle coupling for elevation tracking of a radiation source by the extendable arm of the linear actuator.

6. The solar thermal collector of claim 2 wherein the leveling system comprises a compensating coupling rotatably coupling the absorber housing to the extended reflector surface and azimuthal tracking apparatus, said compensating coupling being constructed for rotating the absorber housing around an elongate axis of the absorber housing relative to the reflector surface through a compensating angle approximately equal and opposite to a tilting angle of the reflector surface to maintain the elongate aperture of the absorber housing in a downward facing direction relative to the earth during elevational tracking of the reflector surface to reduce convection heat loss.

7. The solar thermal collector of claim 6 wherein the leveling system compensating coupling comprises an articulating arm comprising an elongate parallelogram segment having substantially parallelogram sides including a moveable side strut and a reference side strut and pivoting vertices.

8. The solar thermal collector of claim 7 wherein the articulating arm comprises first and second parallelogram segments joined at a triangle joint, the first and second parallel segments comprising respective reference side struts pivotally joined at a first vertex of the triangle joint, and the first and second parallelogram segments comprising respective moveable side struts pivotally coupled at respective second and third vertices of the triangle joint.

9. The solar thermal collector of claim 7 wherein the reference side strut of the elongate parallelogram segment of the articulating arm comprises a specified length of the extended reflector surface.

10. The solar thermal collector of claim 8 wherein the respective reference side struts of the first and second parallelogram segments are pivotally connected respectively to the absorber housing at a first location on the absorber housing and to the reflector surface, and wherein the respective moveable side struts of the first and second parallelogram segments are pivotally connected respectively to the absorber housing at a second location on the absorber housing spaced from the first location and to the azimuthal tracking apparatus.

11. The solar thermal collector of claim 1 wherein the reflector surface comprises a section of a cylindrical curve having a vertex line on the reflector surface and a focal line of the curve generally above the vertex line, and wherein the tracking system is constructed to align the vertex line and focal line substantially in parallel and in alignment with a radiation source to optimize concentrated radiation passing through the elongate aperture of the absorber housing onto the absorber.

12. The solar thermal collector of claim 11 wherein the section of a cylindrical curve comprises a section of a cylindrical parabola with the vertex line of the cylindrical parabola at one end of the reflector surface.

13. The solar thermal collector of claim 11 wherein the section of a cylindrical curve is a section of a cylindrical parabola.

14. A method of concentrating and collecting solar energy using an extended reflector surface in the configuration of a section of a cylindrical curve for concentrating solar energy at a focal line comprising:

mounting an elongate absorber at the focal line for converting solar energy to heat energy, housing the elongate absorber in an insulating elongate absorber housing to reduce convection heat loss, mounting the absorber housing for rotation around an elongate axis of the absorber housing, and forming the absorber housing with an elongate aperture adjacent to the focal line facing downward relative to the earth for passing concentrated solar energy from the extended reflector surface to the elongate absorber;

first tracking the radiation source to different azimuthal angles by rotating the reflector surface to respective rotational angles around a substantially vertical axis relative to the earth;

after azimuthal tracking of the radiation source, tracking the radiation source to different elevation angles above the horizon of the earth by tilting the reflector surface to different respective tilting angles around a substantially horizontal axis relative to the earth, thereby maintaining the focal line and absorber in a substantially horizontal attitude relative to the earth during azimuthal and elevational tracking;

and orienting and maintaining the aperture of the absorber housing in a downward facing direction relative to the earth during elevational tracking to reduce convection heat loss by rotating the absorber housing relative to the reflector surface around an elongate axis of the absorber housing thorough a rotary angle opposite and substantially equal to the tilting angle of the reflector surface during elevational tracking.

15. The method of claim 14 wherein the step of rotating the absorber housing comprises coupling the absorber housing relative to the reflector surface through an articulated arm of at least one parallelogram segment comprising struts coupled at pivoting vertices, said articulated arm of at least one parallelogram segment being constructed to impart rotation to the absorber housing around an elongate housing axis through a rotational angle substantially equal and opposite to a tilting angle of the reflector surface during elevational tracking.

16. The method of claim 14 wherein the section of a cylindrical curve comprises a section of a cylindrical parabola having the vertex line of the cylindrical parabola at one end of the reflector surface and wherein the steps of azimuthal and elevational tracking comprise orienting the vertex line and focal line substantially in parallel and in alignment with the radiation source.

17. A solar thermal collector having an extended reflector surface for concentrating radiation from a radiation source at a focal line, said solar thermal collector being mounted on a support base relative to the earth comprising:

an elongate absorber mounted at the focal lien for converting radiant energy to heat energy, said absorber being housed in an insulating absorber housing to reduce conduction heat loss, said absorber housing being formed with an elongate aperture adjacent to the focal line facing downward relative to the earth for passing concentrated radiant energy reflected from the extended reflector surface onto the absorber;

azimuthal tracking apparatus mounted on the support base and constructed for tracking the radiation source to different respective rotational angles around a substantially vertical axis relative to the earth;

elevational tracking apparatus mounted on the azimuthal tracking apparatus and constructed for tracking the radiation source to different elevation angles by tilting the reflector surface to different respective tilting angles around a substantially horizontal axis relative to the earth while maintaining the focal line and elongate absorber in a substantially horizontal attitude relative to the earth;

and a leveling compensating coupling rotatably coupling the absorber housing to the extended reflector surface and azimuthal tracking apparatus, said leveling compensating coupling being constructed for rotating the absorber housing around an elongate axis of the absorber housing through a compensating angle relative to the reflector surface approximately equal and opposite to a tilting angle of the reflector surface during elevatonal tracking to maintain the aperture of the absorber housing in a downward facing direction relative to the earth to reduce convection heat loss during elevational tracking.

18. The thermal solar collector of claim 17 wherein the leveling compensating coupling comprises an articulating arm comprising an elongate parallelogram segment having parallelogram sides including a moveable side strut and a reference side strut and pivoting vertices, said articulating arm being coupled between the absorber housing and extended reflector surface.

19. The solar thermal collector of claim 18 wherein the articulating arm comprises first and second parallelogram segments joined at a triangle joint;

the first and second parallelogram segments comprise respective reference side struts pivotally joined at a first vertex of the triangle joint;

the first and second parallelogram segments comprise respective moveable side struts pivotally coupled at respective second and third vertices of the triangle joint;

the respective reference side struts of the first and second parallelogram segments are pivotally connected respectively to the absorber housing at a first location on the absorber housing and to the reflector surface;

and the respective moveable side struts of the first and second parallelogram segments are pivotally connected respectively to the absorber housing at a second location on the absorber housing spaced from the first location and to the azimuthal tracking apparatus.

20. The solar thermal collector of claim 19 wherein the reference side strut of the first parallelogram segment of the articulating arm comprise as specified length of the extended reflector surface and wherein the reference side strut of the second parallelogram segment comprises a reference side strut mounted at a fixed angle relative to the specified length of the extended reflector surface.

* * * * *